United States Patent
Curtin

Patent Number: 6,013,871
Date of Patent: Jan. 11, 2000

[54] METHOD OF PREPARING A PHOTOVOLTAIC DEVICE

[76] Inventor: Lawrence F. Curtin, 215 Cranwood Dr., Key Biscayne, Fla. 33149

[21] Appl. No.: 09/035,002

[22] Filed: Mar. 5, 1998

Related U.S. Application Data

[60] Provisional application No. 60/051,575, Jul. 2, 1997.

[51] Int. Cl.$^7$ .......................... H01L 31/048; H01L 31/05
[52] U.S. Cl. .......................... 136/251; 136/244; 136/256; 136/261; 136/263; 257/433; 257/457; 257/40; 438/66; 438/67; 438/64; 438/82; 438/85
[58] Field of Search ..................................... 136/244, 251, 136/256, 261, 263; 257/433, 457, 40; 438/66, 67, 64, 82, 85

[56] References Cited

U.S. PATENT DOCUMENTS

| | | | |
|---|---|---|---|
| 4,106,951 | 8/1978 | Masi | 136/263 |
| 4,320,247 | 3/1982 | Gatos et al. | 136/255 |
| 4,485,265 | 11/1984 | Gordon et al. | 136/255 |
| 4,571,448 | 2/1986 | Barnett | 136/259 |
| 4,963,196 | 10/1990 | Hashimoto | 136/257 |
| 5,401,331 | 3/1995 | Ciszek | 136/261 |
| 5,480,494 | 1/1996 | Inoue | 136/251 |
| 5,728,230 | 3/1998 | Komori et al. | 136/251 |

FOREIGN PATENT DOCUMENTS 9-55524   2/1997   Japan .

Primary Examiner—Alan Diamond
Attorney, Agent, or Firm—Richard C. Litman

[57] ABSTRACT

A method of creating a photovoltaic device for the conversion of light to electrical current comprises the steps of: (a) providing a layer of glue on a substrate; (b) laying down one or more elements of silicon doped with varying amounts of boron and phosphorous on the glue; (c) applying electro-conductive paint and/or metal strips between the silicon elements, wherein the electro-conductive paint includes materials such as nickel, silver, copper, etc.; (d) applying electro-conductive paint and/or metal strips to form two final electrical connectors to the photovoltaic device; (e) sealing the device from air and moisture with coating of clear acrylic lacquer or other material. An alternative method comprises the steps of (a) providing a substrate capable of supporting multiple layers of paint and ink; (b) forming an electro-conductive layer on the substrate; (c) forming a layer of platinum catalyst ink or other material on the electro-conductive layer; (d) forming a layer of electrolyte and reduced oxidized couple on the platinum catalyst ink or other material layer; (e) forming a layer of titanium dioxide that has been doped with ruthenium or gallium or other material, on the electrolyte and reduced oxidized couple layer; (f) forming a transparent, electrically conductive layer of tin oxide on the titanium dioxide layer; and (g) sealing the cell with a coating of clear acrylic lacquer or other material.

10 Claims, 1 Drawing Sheet

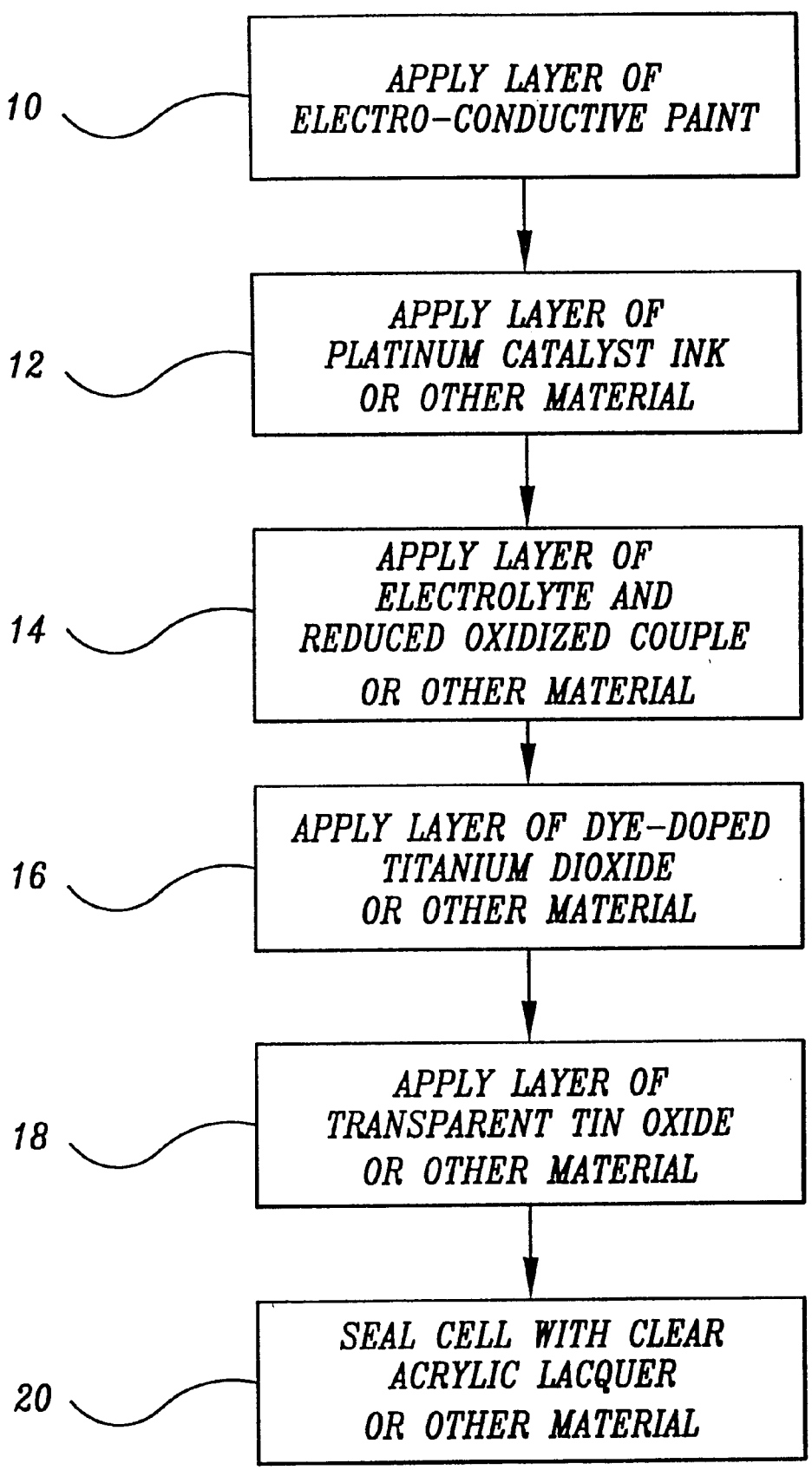

METHOD OF PREPARING A PHOTOVOLTAIC DEVICE

CROSS-REFERENCE TO RELATED APPLICATION

This application claims the benefit of U.S. Provisional Patent Application Ser. No. 60/051,575, filed Jul. 2, 1997.

BACKGROUND OF THE INVENTION

1. Field of the Invention

The present invention relates to a method of creating a photovoltaic device for the conversion of light to electrical current.

2. Description of Related Art

Photovoltaic devices or solar cells absorb sunlight and convert it directly into useable electrical energy. This is called the photovoltaic effect; "photo" for light and "voltaic" from the name of the Italian scientist, Volta, who gave us the volt. When light energy or photons strike certain materials, internal voltages are created. The basic scientific principles which underlie this effect are well understood.

The related art is represented by the following patents of interest.

U.S. Pat. No. 4,106,951, issued on Aug. 15, 1978 to James V. Masi, describes a photoelectric device with a P-type organic layer and an N-type inorganic layer. Masi does not suggest the method of creating a photovoltaic effect in accordance with the claimed invention.

U.S. Pat. No. 4,320,247, issued on Mar. 16, 1982 to Harry C. Gatos et al., describes a photoelectric device with multiple Czochralski silicon crystal p-n junction devices. Gatos et al. do not suggest the method of creating a photovoltaic effect in accordance with the claimed invention.

U.S. Pat. No. 4,485,265, issued on Nov. 27, 1984 to Roy G. Gordon et al., describes a photovoltaic device with a transparent, electrically conductive metal oxide layer and a light-absorbing semiconductive photovoltaic layer. Gordon et al. do not suggest the method of creating a photovoltaic effect in accordance with the claimed invention.

U.S. Pat. No. 4,571,448, issued on Feb. 18, 1986 to Allen M. Barnett, describes photoelectric device including an opaque electrical contact substrate, an optically reflective barrier layer, a first semiconductor layer, a second semiconductor layer, and a transparent electrical contact. Barnett does not suggest the method of creating a photovoltaic effect in accordance with the claimed invention.

U.S. Pat. No. 4,963,196, issued on Oct. 16, 1990 to Yuichi Hashimoto, describes an organic photoelectric device. Hashimoto does not suggest the method of creating a photovoltaic effect in accordance with the claimed invention.

U.S. Pat. No. 5,401,331, issued on Mar. 28, 1995 to Theodore F. Ciszek, describes a solar cell with a substrate formed of a metallurgical grade alloy of silicon and boron. Ciszek does not suggest the method of creating a photovoltaic effect in accordance with the claimed invention.

None of the above inventions and patents, taken either singly or in combination, is seen to describe the instant invention as claimed.

SUMMARY OF THE INVENTION

The present invention is a method of creating a photovoltaic device for the conversion of light to electrical current. A preferable method includes the use of silicon elements glued to a substrate and interconnected with electro-conductive paint and/or metal strips, comprising the steps of: (a) providing a layer of glue on a substrate, such as concrete, wood, treated metal, road pavement, roofing material, plastic, etc.; (b) laying down one or more elements of silicon doped with varying amounts of boron and phosphorous on the glue; (c) applying electro-conductive paint and/or metal strips between the silicon elements, wherein the paint and/or metal strips include materials such as silver, copper, nickel, etc.; (d) applying electro-conductive paint and/or metal strips to form two final electrical connectors to the photovoltaic device; and (e) sealing the device from air and moisture with coating of clear acrylic lacquer or other material.

An alternative method of creating a photovoltaic device for the conversion of light to electrical current includes the steps of (a) providing a substrate capable of supporting multiple layers of paint and ink for a photovoltaic device; (b) forming an electro-conductive layer on the substrate; (c) forming a layer of platinum catalyst ink or other material on the electro-conductive layer; (d) forming a layer of electrolyte and reduced oxidized couple on the platinum catalyst ink or other material layer; (e) forming a layer of titanium dioxide (ink) that has been doped with ruthenium or gallium or other material, on the electrolyte and reduced oxidized couple layer; (f) forming a transparent, electrically conductive layer of tin oxide on the titanium dioxide layer; and (g) sealing the cell with a coating of clear acrylic lacquer or other material.

Accordingly, it is a principal object of the invention to provide a method of creating a photovoltaic device for the conversion of light to electrical current using silicon elements glued to a substrate and interconnected with electro-conductive paint and/or metal strips.

It is another object of the invention to provide a method of creating a photovoltaic device for the conversion of light to electrical current using multiple layers of paint and ink.

It is an object of the invention to provide improved elements and arrangements thereof in a photovoltaic method and device for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

The sole FIGURE shows a flow diagram of the steps involved in one embodiment of producing a photovoltaic device according to the invention.

DETAILED DESCRIPTION OF THE PREFERRED EMBODIMENT

The present invention is concerned with a method of creating a photovoltaic device for the conversion of light to electrical current. A preferable method includes a first step of applying a layer of glue onto a substrate. The glue is preferably formed from methyl ethylketone. Various surfaces can be employed as the substrate, such as road pavement, concrete, wood, treated metal, roofing material, plastic, or another surface. One or more elements of silicon doped with varying amounts of boron and phosphorous are then laid down in a second step on the glue. A third step includes the application of electro-conductive paint and/or metal strips between the silicon elements to electrically interconnect the silicon elements. The paint must be able to bind to the glued substrate between the silicon elements and have a high conductivity. This paint may include materials such as silver, copper, nickel, or any mix of these, or other pigments, binders, diluents and possibly other materials. The metal strips may be formed out of any type of metal, such as silver, copper, nickel, etc. A fourth step of the method includes the application of electro-conductive paint and/or metal strips to form two final electrical connectors to the photovoltaic device. A fifth or final step of the method then includes sealing the photovoltaic device from air and moisture with a coating of clear acrylic lacquer or other material device. The optical transmittance of the transparent layer should preferably be as high as possible.

After the device has been constructed as outlined above, electrical connectors (e.g., of copper wire, silver wire, etc.) are attached to the two final painted electrical connectors and/or copper strips. The device employing one transparent electrode exposed to a visible light source (e.g. sunlight) is then capable of converting such light into electrical current. The device will continuously generate electrical current so long as it is continuously drawn off from the device (e.g. through the electrical connectors).

An alternative method of creating a photovoltaic device includes the use of multiple layers of paint and ink, as shown in the FIGURE. The various paints and inks are comprised of pigments, binders, diluents, and possibly other materials. The blend of ingredients may vary. The efficiencies produced by this method will vary with the materials used in each layer of the device. Film thickness, geometry, curing temperature, temperature stability, snap off distance, screen mesh size, squeegee material, substrate porosity, ambient temperature of screening equipment, screen material, emulsion thickness and the skill of the person applying the layers are some of the factors that will determine the cell's efficiencies.

As shown in the FIGURE, the first step 10 in creating a photovoltaic device is made by painting a layer of electro-conductive paint onto a substrate. Various surfaces can be employed as the substrate, such as concrete, wood, treated metal, road pavement, roofing material, plastic or another surface. This layer of paint must be able to bind to the substrate and have a high conductivity. This layer may include materials such as nickel, silver, copper or any mix of these, or other pigments, binders, diluents and possibly other materials. An area is available for an electrical connector. The layer is preferably formed by means of a screen painting technique.

The second step 12 of the method includes forming a layer of platinum catalyst ink or other material on the electro-conductive layer. This layer is preferably formed by means of a screen painting technique. The third step 14 of the method includes forming a layer of electrolyte, such as aqueous, nonaqueous, etc., and reduced oxidized couple on the platinum catalyst ink layer. This layer is preferably formed by means of a screen painting technique. The fourth step 16 of the method includes forming a layer of titanium dioxide (ink) or other material, that has been dye doped with ruthenium or gallium (or other material), on the electrolyte and reduced oxidized couple layer. This layer is preferably formed by means of a screen painting technique. The fifth step 18 of the method includes forming a transparent and electrically conductive layer of tin oxide or other material on the titanium dioxide layer. An area is left for an electrical connector on the tin oxide layer. The sixth step 20 of the method includes sealing the cell from air and moisture with a coating of clear acrylic lacquer or other material device. The optical transmittance of the transparent layer should preferably be as high as possible.

After the device has been constructed as outlined above, electrical connectors (e.g., of copper wire, silver wire, etc.) are attached to the top and bottom conductive layers. The device employing one transparent electrode exposed to a visible light source (e.g. sunlight) is then capable of converting such light into electrical current. The device will continuously generate electrical current so long as it is continuously drawn off from the device (e.g. through the electrical connectors).

It is to be understood that the present invention is not limited to the sole embodiment described above, but encompasses any and all embodiments within the scope of the following claims.

I claim:

1. A method for preparing a photovoltaic device, comprising the steps of:

(a) providing a substrate capable of supporting multiple layers of paint and ink for a photovoltaic device;

(b) forming an electrically conductive paint layer of electro-conductive material on the substrate;

(c) forming a layer of platinum catalyst ink on said electrically conductive paint layer;

(d) forming a layer of electrolyte and reduced oxidized couple on said platinum catalyst ink layer;

(e) forming a layer of titanium dioxide that has been dye doped with ruthenium or gallium, or other dye on said electrolyte and reduced oxidized couple layer;

(f) forming a transparent, electrically conductive layer of tin oxide on said titanium dioxide layer; and (h) sealing the device with a layer of clear acrylic lacquer or other material.

2. A method for preparing a photovoltaic device according to claim 1, wherein the substrate is selected from the group consisting of concrete, wood, treated metal, road pavement, roofing material, and plastic.

3. A method for preparing a photovoltaic device according to claim 1, wherein the electrally conductive paint layer contains nickel, silver, copper, or mixtures thereof.

4. The method for preparing a photovoltaic device according to claim 1, wherein steps (c), (d), and (e) are formed by means of a screen painting technique.

5. A photovoltaic device comprising a plurity of elements of silicon doped with varying amounts of boron or phosphorous glued using methyl ethylketone to a substrate and electrically interconnected with electro-conductive paint or metal strips or both, wherein the photovoltaic device includes two final electrical connectors formed by electro-conductive paint or metal strips or both to the photovoltaic device, and wherein the photovoltaic device is sealed from air and moisture with a coating of clear acrylic lacquer or other material.

6. A photovoltaic device according to claim 5, wherein the substrate is selected from the group consisting of concrete, wood, treated metal, road pavement, roofing material, and plastic.

7. A photovoltaic device according to claim 5, wherein the electro-conductive paint contains nickel, silver, copper, or mixtures thereof.

8. A photovoltaic device according to claim 5, wherein the metal strips are formed of silver.

9. A photovoltaic device according to claim 5, wherein the metal strips are formed of copper.

10. A photovoltaic device according to claim 5, wherein the metal strips are formed of nickel.

* * * * *